(12) United States Patent
Chung

(10) Patent No.: US 8,550,483 B2
(45) Date of Patent: Oct. 8, 2013

(54) LOCKING COLLAR FOR A BICYCLE HUB ASSEMBLY

(76) Inventor: Hsiu-Mei Chung, Taichung (TW)

( * ) Notice: Subject to any disclaimer, the term of this patent is extended or adjusted under 35 U.S.C. 154(b) by 0 days.

(21) Appl. No.: 13/432,370

(22) Filed: Mar. 28, 2012

(65) Prior Publication Data

US 2012/0195676 A1 Aug. 2, 2012

(30) Foreign Application Priority Data

Dec. 17, 2010 (TW) ................ 99224578 U

(51) Int. Cl.
*B62K 1/00* (2006.01)
*B62K 17/00* (2006.01)
*B62K 21/00* (2006.01)
*B62M 3/00* (2006.01)
*B62M 5/00* (2006.01)
*B62M 7/00* (2010.01)
*B62M 9/00* (2006.01)
*B62M 11/00* (2006.01)
*B62M 13/00* (2010.01)
*B62M 15/00* (2006.01)

(52) U.S. Cl.
USPC ........... 280/279; 280/288; 403/158; 403/164; 403/315; 403/320

(58) Field of Classification Search
USPC ............ 403/1, 150, 156, 158, 161, 162, 164, 403/282, 315–317, 320; 464/30, 42, 45; 280/279, 288; 301/110.5, 110.6, 301/111.05, 124.2
See application file for complete search history.

(56) References Cited

U.S. PATENT DOCUMENTS

| | | | | |
|---|---|---|---|---|
| 3,922,018 A | * | 11/1975 | Shook | 301/110.5 |
| 4,424,981 A | * | 1/1984 | Maxwell, III | 280/288 |
| 4,744,119 A | | 5/1988 | Omori | |
| 5,531,510 A | * | 7/1996 | Yamane | 301/110.5 |
| 6,089,675 A | * | 7/2000 | Schlanger | 301/124.2 |
| 6,523,659 B2 | * | 2/2003 | Kanehisa et al. | 192/64 |
| 6,553,364 B1 | * | 4/2003 | Wu | 1/1 |
| 6,742,849 B1 | * | 6/2004 | Denby | 301/124.2 |

* cited by examiner

*Primary Examiner* — Gregory Binda
*Assistant Examiner* — Nahid Amiri
(74) *Attorney, Agent, or Firm* — Shook Hardy & Bacon LLP

(57) ABSTRACT

A locking collar capable of coupling a hub-and-axle subassembly to a fork dropout of a bicycle for locking an antifriction bearing in place includes an outward pressed surface adapted to confront a pressing surface of the fork dropout, an inward abutting surface adapted to confront the antifriction bearing, an axially extending female threaded surface adapted to be screwed on a threaded end segment of an axle, a tubular extension extending from the outward pressed surface to be insertable into the fork dropout, and a plurality of circumferentially extending rib segments which are disposed on the outward pressed surface to be in pressing engagement with the pressing surface of the fork dropout in a tightened state.

4 Claims, 6 Drawing Sheets

LOCKING COLLAR FOR A BICYCLE HUB ASSEMBLY

BACKGROUND OF THE INVENTION

1. Field of the Invention

This invention relates to a bicycle hub assembly, more particularly to a locking collar capable of coupling a hub-and-axle subassembly to a fork dropout of a bicycle.

2. Description of the Related Art

Referring to FIGS. 1 and 2, a conventional hub assembly for a bicycle is shown to include a hub shell 1 rotatably surrounding an axle 4 through two antifriction bearings 5, and two collars 2 disposed on the axle 4 to respectively abut against the antifriction bearings 5 in a tightened state. Each of the collars 2 has an outer end face 201 and an annular retaining region 202 protruding from the outer end face 201. The annular retaining region 202 has a plurality of radially extending indentations 203 to be retainingly engaged with a fork dropout 3. As the frictional force generated between the fork dropout 3 and the annular retaining region 202 having the radially extending indentations 203 is insufficient, the collar 2 may rotate relative to the fork dropout 3 after a period of use, which will adversely affect rotation of the hub shell 1 and a wheel of the bicycle.

SUMMARY OF THE INVENTION

An object of the present invention is to provide a locking collar which can be firmly engaged with a bicycle fork so as not to rotate relative thereto.

According to this invention, the locking collar is capable of coupling a hub-and-axle subassembly to a fork dropout of a bicycle for locking an anti friction bearing in place. The hub-and-axle subassembly includes an axle having a threaded end segment, and a hub shell rotatably mounted relative to and surrounding the axle through the antifriction bearing. The fork dropout has a pressing surface which is axially tightened toward the hub-and-axle subassembly from an untightened position. The locking collar includes an outward pressed surface adapted to confront the pressing surface of the fork dropout, an inward abutting surface which is axially opposite to the outward pressed surface, and which is adapted to confront the antifriction bearing, and an axially extending female threaded surface which is adapted to be screwed on the threaded end segment of the axle so as to bring the inward abutting surface into abutment with the antifriction bearing to place the outward pressed surface in the untightened position. The locking collar further includes a tubular extension extending from the outward pressed surface to be insertable into the fork dropout, and a plurality of circumferentially extending rib segments which are disposed on the outward pressed surface to be in pressing engagement with the pressing surface of the fork dropout in a tightened state.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
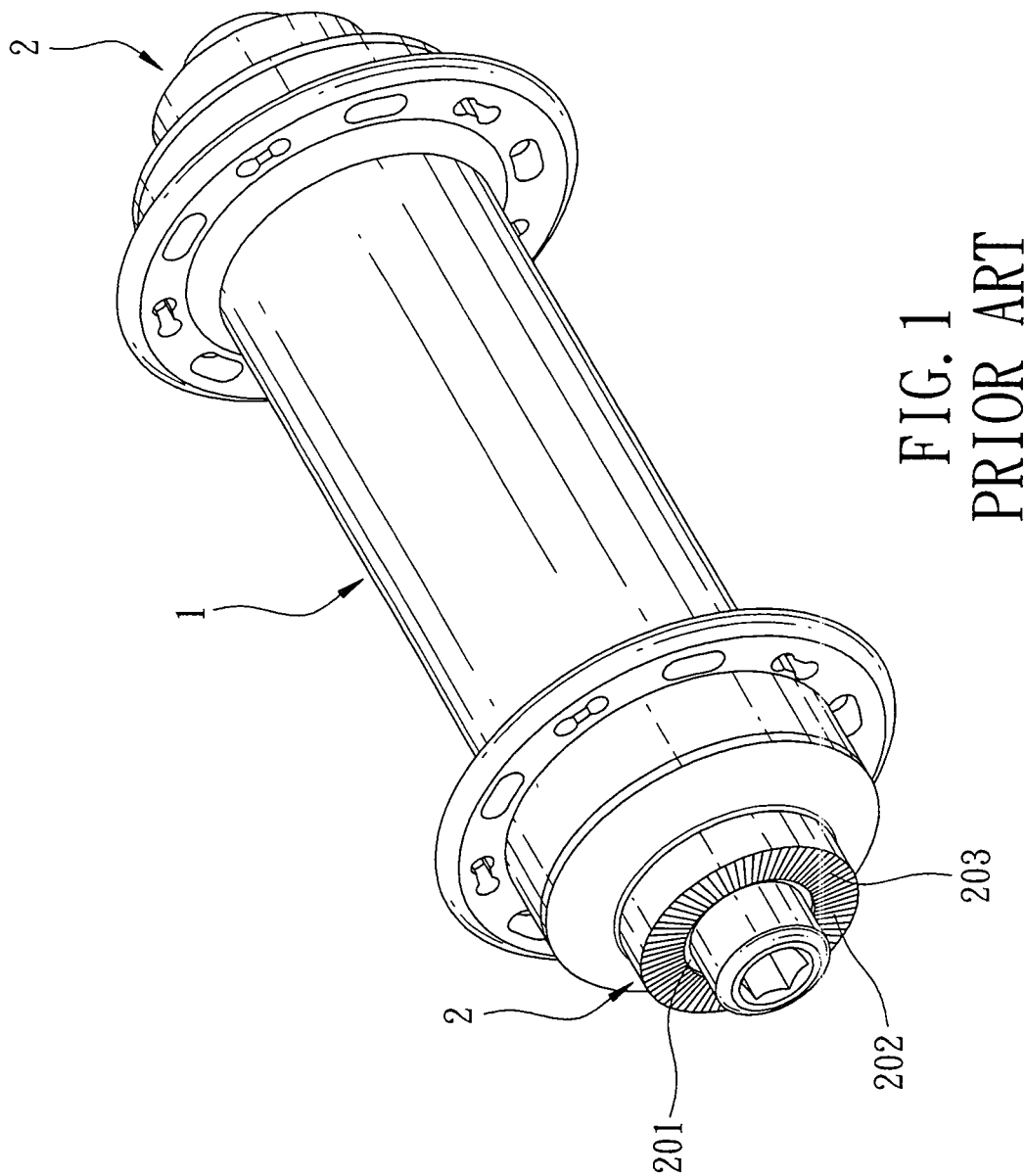
FIG. 1 is a perspective view of a conventional bicycle hub assembly.
Figure 2:
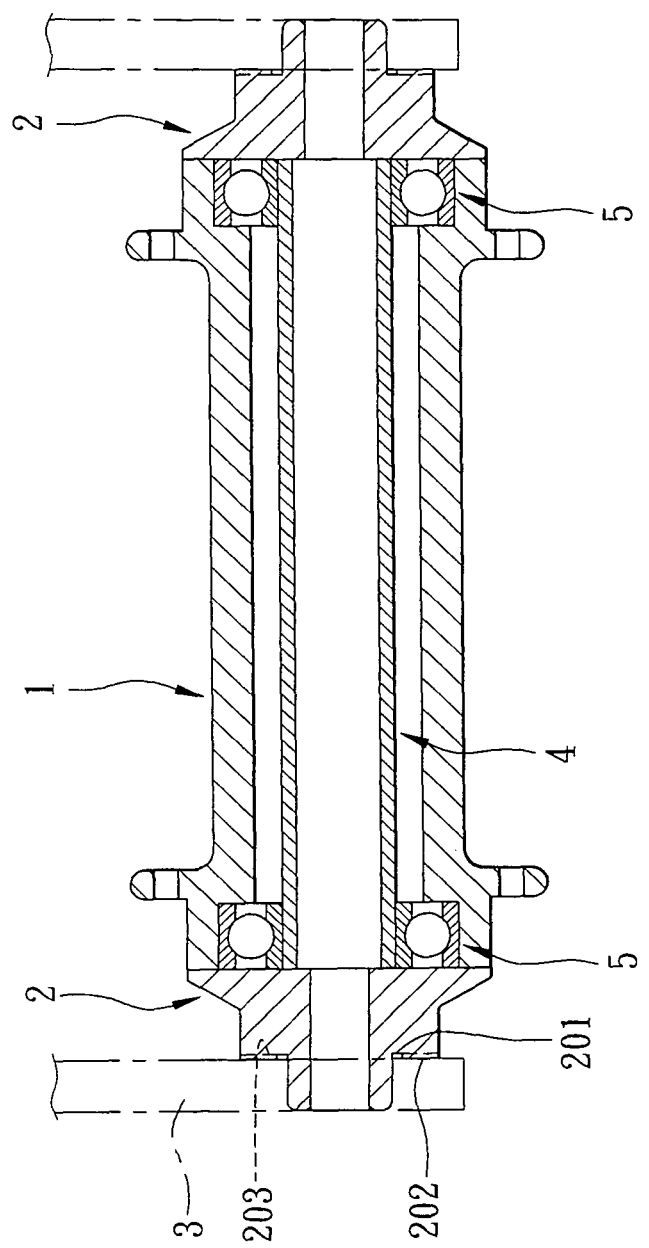
FIG. 2 is a sectional view of the conventional bicycle hub assembly.

Before the present invention is described in greater detail, it should be noted that same reference numerals have been used to denote like elements throughout the specification.

Figure 3:
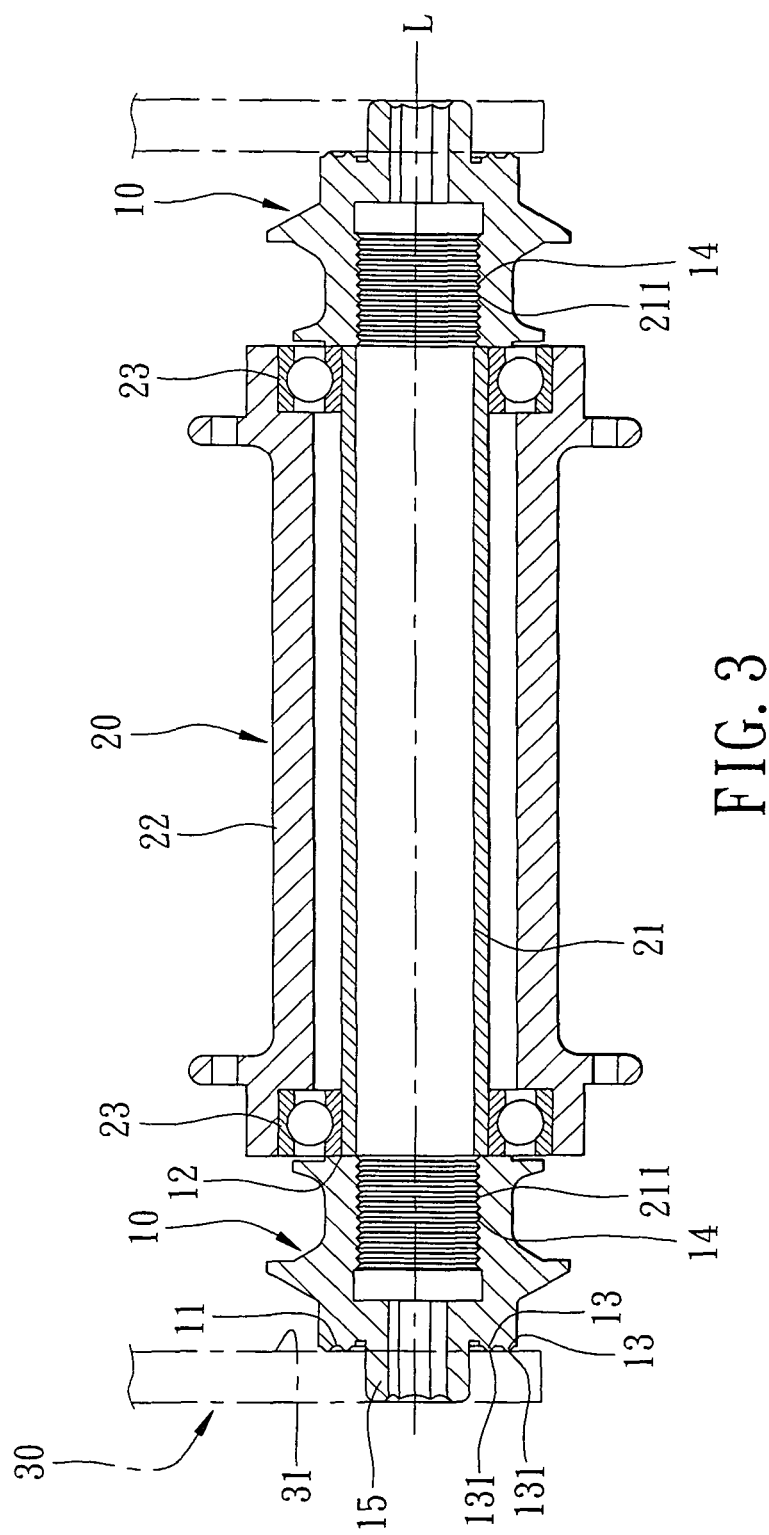
FIG. 3 is a sectional view of a first embodiment of a locking collar according to this invention when mounted to a hub-and-axle subassembly.

Referring to FIG. 3, the first embodiment of a locking collar 10 according to the present invention is shown to couple a hub-and-axle subassembly 20 to one of two fork dropouts 30 of a bicycle. The hub-and-axle subassembly 20 includes a hollow axle 21 extending along an axis (L) and having two threaded end segments 211, and a hub shell 22 rotatably mounted relative to and surrounding the axle 21 through two antifriction bearings 23 which are received in two annular spaces that are defined between the hub shell 22 and the axle 21, and that are exposed axially and to exterior of the hub shell 22. Each of the fork dropouts 30 has a pressing surface 31 which is axially tightened by a tightening unit (not shown), such as a quick release clamping mechanism that is operable to tighten the pressing surfaces 31 of the fork dropout 30 toward the hub-and-axle subassembly 20 from an untightened position.

Figure 4:
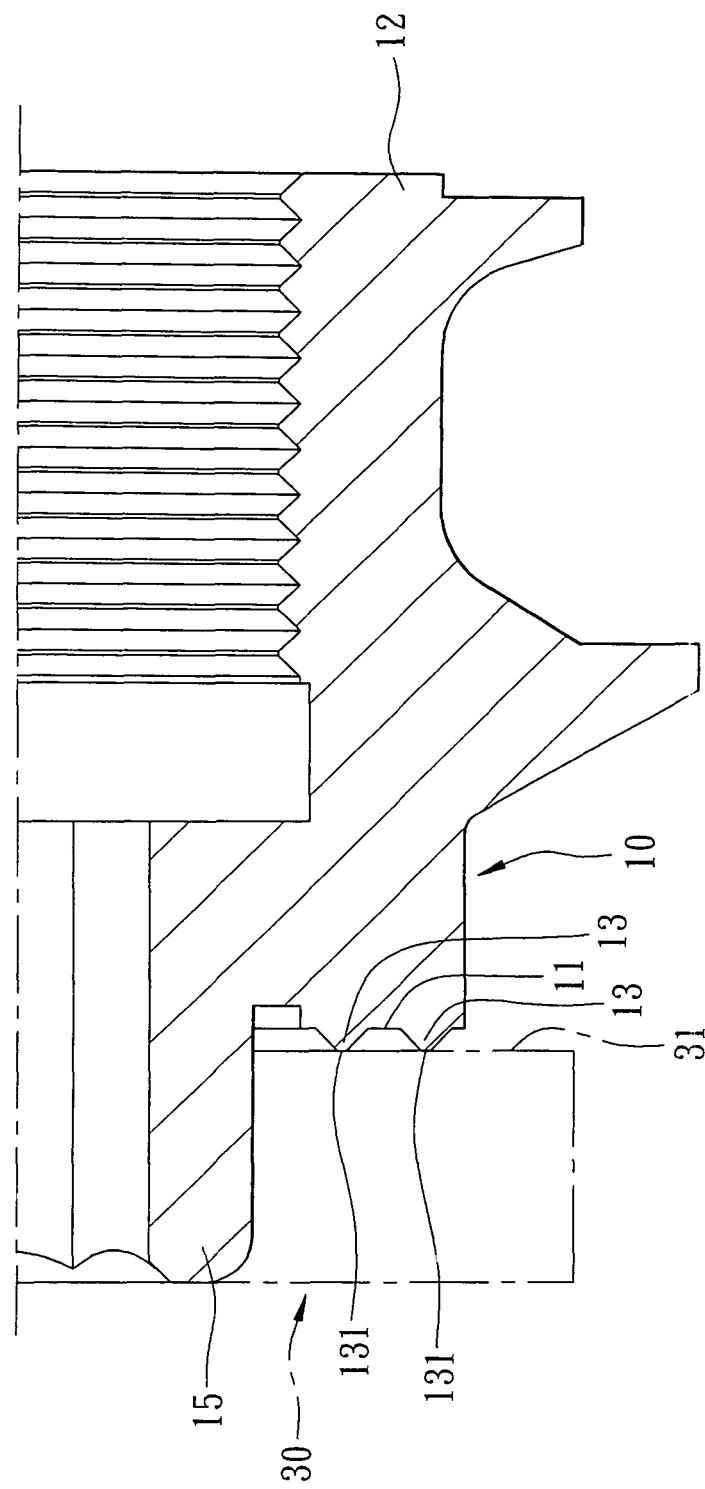
FIG. 4 is an enlarged sectional view of a portion of the first embodiment.
Figure 5:
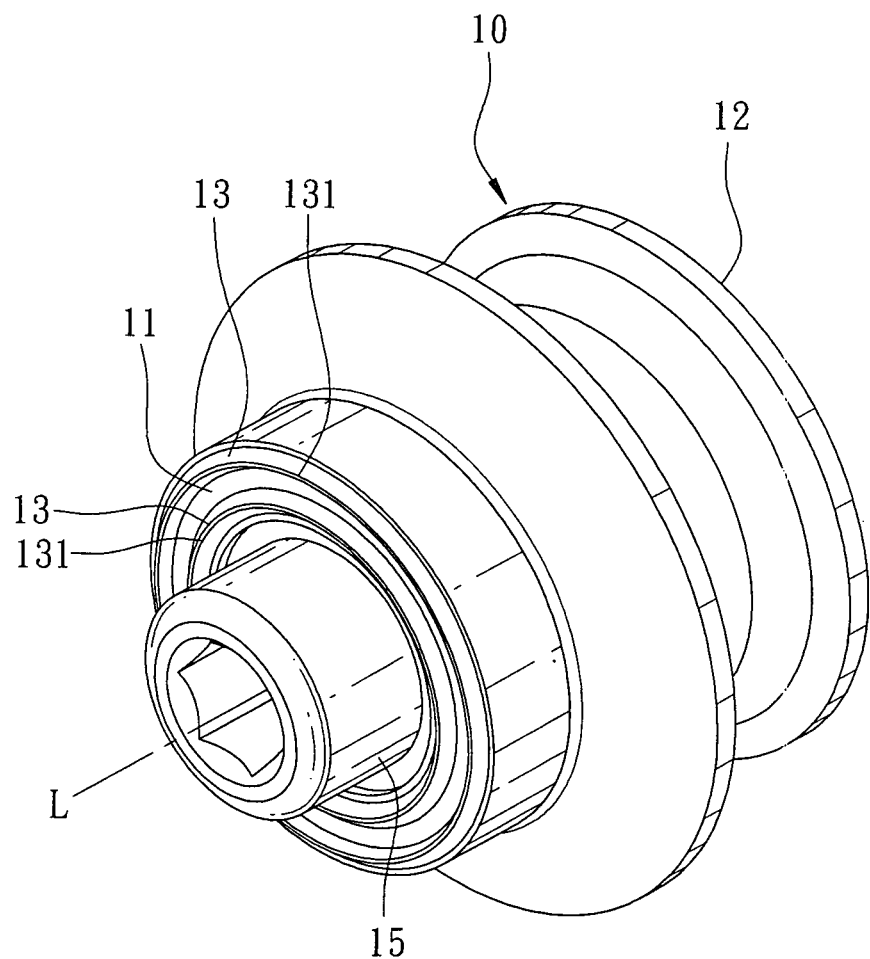
FIG. 5 is a perspective view of the first embodiment.

As shown in FIGS. 3 to 5, the locking collar 10 of this embodiment includes an outward pressed surface 11 adapted to confront the pressing surface 31 of the corresponding fork dropout 30, an inward abutting surface 12 which is axially opposite to the outward pressed surface 11, and which is adapted to confront the corresponding anti friction bearing 23, and an axially extending female threaded surface 14 which is adapted to be screwed on the corresponding threaded end segment 211 of the axle 21 so as to bring the inward abutting surface 12 into abutment with the antifriction bearing 23 to place the outward pressed surface 11 in the untightened position.

The locking collar 10 further includes a tubular extension 15 extending from the outward pressed surface 11 to be insertable into the fork dropout 30, and a plurality of circumferentially extending rib segments 13 which are disposed on and which protrude from the outward pressed surface 11 to serve as a force focusing member to be in pressing engagement with the pressing surface 31 of the fork dropout 30 in a tightened state. Each of the circumferentially extending rib segments 13 is tapered and has a pointed edge 131 that extends along a circumferential line about the axis (L) to be in loose engagement with the pressing surface 31 of the fork dropout 30 in the untightened position. Through an axially tightening force delivered by the tightening unit, the pressing surface 31 is displaced axially to be in pressing engagement with the circumferentially extending rib segments 13 so as to prevent rotation of the locking collar 10 relative to the fork dropout 30 while permitting the hub shell 22 to be driven to rotate freely and smoothly.

Accordingly, by virtue of the pointed edges 131 extending along the circumferential lines, a greater frictional force is generated between the outward pressed surface 11 and the pressing surface 31.

Figure 6:
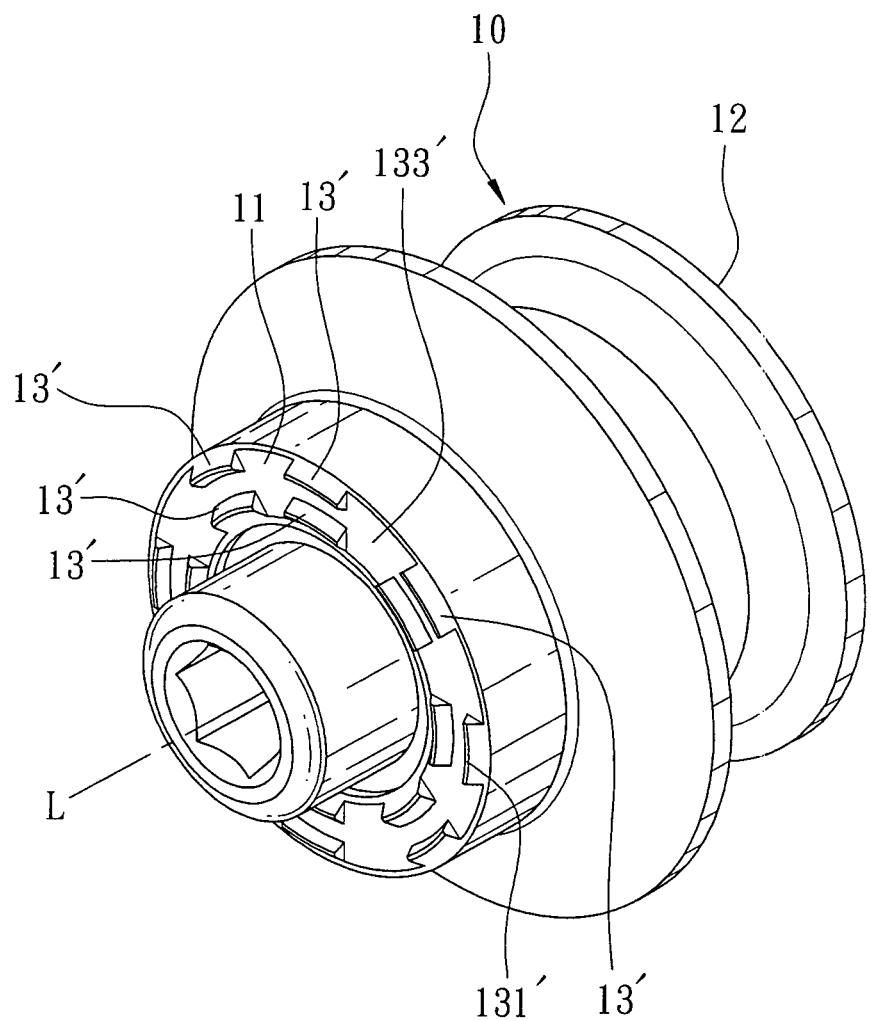
FIG. 6 is a perspective view of a second embodiment of a locking collar according to this invention.

In this embodiment, each of the circumferentially extending rib segments 13 extends circumferentially and to cooperatively form a ring rib. Alternatively, as shown in FIG. 6, in the second embodiment of the locking collar 10, each of the circumferentially extending rib segments 13' is tapered to form a pointed edge 131'. Two adjacent ones of the circumferentially extending rib segments 13' are angularly displaced from each other about the axis (L) by an interrupting gap 133' which may be formed by cutting an interconnecting region out of the respective extending rib segment 13'.

In assembly, the locking collar 10 is threadedly mounted on the threaded end segment 211 of the axle 21 to permit the inward abutting surface 12 to abut against the antifriction bearing 23. Subsequently, the tubular extension 15 is inserted into the fork dropout 30 to permit the outward pressed surface 11 to abut against the pressing surface 31 of the fork dropout 30 so as to be placed in the untightened position. Thereafter, the tightening unit is operated to perform a tightening action such that the pressing surface 31 is in pressing engagement with the pointed edges 131, 131' of the circumferentially extending rib segments 13, 13'.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A bicycle hub assembly comprising:
   a hub-and-axle subassembly including an axle extending along an axis and having a threaded end segment, a hub shell rotatably mounted relative to and surrounding said axle, and an antifriction bearing disposed between said hub shell and said axle to minimize rotational friction therebetween;
   a fork dropout having a pressing surface which is axially tightened toward said hub-and-axle subassembly from an untightened position; and
   a locking collar configured to couple said hub-and-axle subassembly to said fork dropout to lock said antifriction bearing in place, and including:
   an outward pressed surface configured to confront said pressing surface of said fork dropout;
   an inward abutting surface which is axially opposite to said outward pressed surface, and which is configured to confront said antifriction bearing;
   an axially extending female threaded surface which is configured to be screwed on said threaded end segment of said axle so as to bring said inward abutting surface into abutment with said antifriction bearing to place said outward pressed surface in the untightened position;
   a tubular extension extending from said outward pressed surface, and configured to be insertable into said fork dropout; and
   a plurality of circumferentially extending rib segments which are disposed on said outward pressed surface to be in pressing engagement with said pressing surface of said fork dropout in a tightened state.

2. The bicycle hub assembly as claimed in claim 1, wherein each of said circumferentially extending rib segments has a pointed edge that extends along a circumferential line about the axis to be in pressing engagement with said pressing surface of said fork dropout in the tightened state.

3. The bicycle hub assembly as claimed in claim 2, wherein said circumferentially extending rib segments extend circumferentially and cooperatively form a ring rib.

4. The bicycle hub assembly as claimed in claim 2, wherein two adjacent ones of said circumferentially extending rib segments are angularly displaced from each other about the axis by an interrupting gap.

* * * * *